United States Patent [19]
Brandstetter

[11] 3,867,254

[45] Feb. 18, 1975

[54] DEVICE FOR SEALING A ROTATING PLUG IN A NUCLEAR REACTOR

[75] Inventor: Robert Brandstetter, Meschers, France

[73] Assignee: Commissariat a l'Energie Atomique, Paris, France

[22] Filed: Sept. 11, 1973

[21] Appl. No.: 396,178

Related U.S. Application Data

[63] Continuation-in-part of Ser. No. 234,013, March 13, 1972, abandoned.

[30] Foreign Application Priority Data

Mar. 17, 1971  France .............................. 71.09254

[52] U.S. Cl. .................................. 176/87, 220/46 P
[51] Int. Cl. ............................................. G21c 19/00
[58] Field of Search ........ 176/87, 37, 38; 220/46 R, 220/46 P

[56] References Cited
UNITED STATES PATENTS

| | | | |
|---|---|---|---|
| 2,821,325 | 1/1958 | Chapellier et al. .................. | 176/87 |
| 3,043,469 | 7/1962 | Leach ............................... | 220/46 P |
| 3,514,115 | 5/1970 | Gallo ................................. | 176/87 |
| 3,533,530 | 10/1970 | Gallo et al. ...................... | 220/46 R |
| 3,669,303 | 6/1972 | Launay ............................. | 220/46 P |

*Primary Examiner*—Harvey E. Behrend
*Attorney, Agent, or Firm*—Cameron, Kerkam, Sutton, Stowell & Stowell

[57] ABSTRACT

The invention relates to the sealing of a rotating plug in a nuclear reactor. The sealing arrangement comprises a friction track which is formed along the periphery of the top of a ring mounted on a stationary element. An annular base coaxial with the plug is secured in sealing-tight manner to the stationary bearing around the ring and the track by means of a seal which rests on the annular base and also on the friction track of the ring and which comprises at least one friction ring and a clamping spring ring. The seal is clamped against the friction track by retractable clamping means when the plug is stationary, the retractable clamping means being carried by a ring secured to the first-mentioned ring.

4 Claims, 3 Drawing Figures

DEVICE FOR SEALING A ROTATING PLUG IN A NUCLEAR REACTOR

This is a continuation-in-part of application Ser. No. 234,013, filed Mar. 13, 1972, now abandoned.

This invention relates to a device for sealing a rotating plug in a nuclear reactor.

In some nuclear reactors, the vessel containing the reactor core is closed by a rotating plug bearing a system for manipulating and replacing fuel elements. Static sealing-tightness is therefore, needed between the plug and the stationary portion of the reactor vessel during normal operation of the reactor, and dynamic sealing-tightness is required when the plug is rotated, e.g. in order to insert new fuel elements.

It is very difficult, using a single substance, to construct a seal which is sufficiently hard-wearing and resilient to withstand prolonged reactor operation and then, when the reactor stops, friction which is greater in proportion as static sealing-tightness is greater. Accordingly, in existing devices the two functions are usually performed by different seals. Existing devices are therefore of complex construction, which multiplies the causes of breakdown, since the sealing means must be pressed tightly between the plug and the vessel in order to withstand the pressure inside the vessel, yet must also be sufficiently loose to prevent excessive frictional wear when the plug rotates with respect to the reactor vessel.

An object therefore of the invention is to provide a sealing means of simple construction which can provide static and dynamic sealing-tightness together with reduced frictional wear and seal fatigue.

According to the invention there is provided a device for sealing a nuclear reactor plug rotating in a stationary bearing and secured to a ring resting above the stationary bearing on a track, said device comprising a friction track formed on the entire periphery of the top part of the ring, an annular base coaxial with the plug and secured in sealing-tight manner to the stationary bearing around the ring and the track, a seal resting on the annular base and on the friction track of the ring and comprising at least one friction ring and a clamping spring ring, and retractable means for clamping the seal against the friction track when the plug is stationary.

In a preferred embodiment, the seal comprises a friction ring and a resilient ring on top of one another and annular springs, one of which is between the two latter rings and the other of which covers the top part of the resilient ring.

Consequently, the seal has excellent friction properties, due to the substance which forms the layer in contact with the friction track, and provides excellent contact with the friction track owing to the clamping springs, which are all the more effective because they are nearly always insulated from the atmosphere in the reactor vessel, thus limiting the risk of damage.

The seal, in combination with the retractable clamping means, can be used to adjust the force with which the seal is clamped against the friction track i.e., to limit it very considerably during the rotation of the plug, whereas the force can be at a maximum when the plug is immobilised. This reduces the wear on the seal and considerably improves its efficiency, and working life.

Since the device can be dismantled readily, the clamping means or even the seal can readily be replaced without impairing the operation of the whole.

The invention will now be described by way of example with reference to the accompanying drawings in which.

Figure 1:
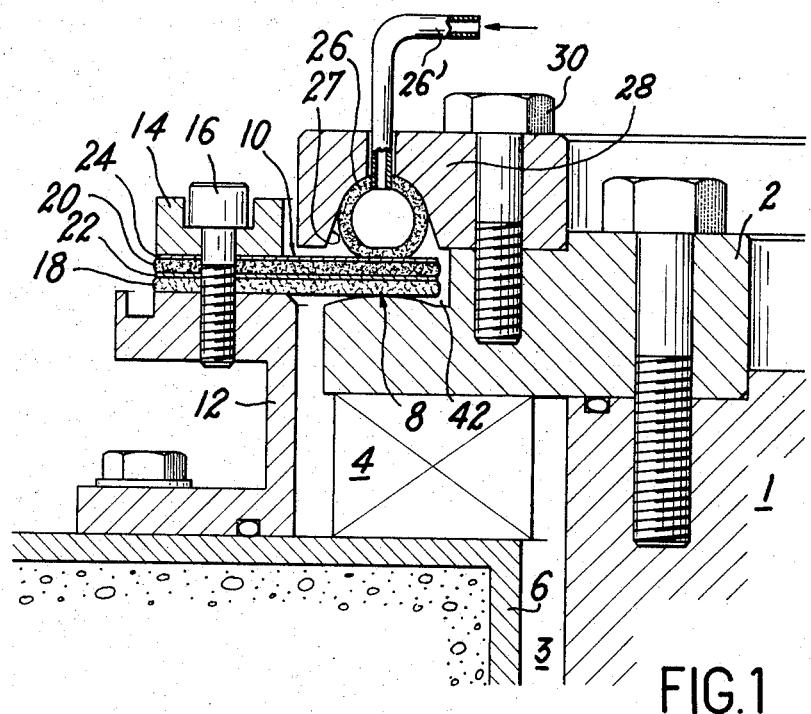
FIG. 1 is a view in partial longitudinal cross-section of a sealing device for a rotating plug providing static sealing-tightness.

In a nuclear reactor the rotating plug, which is adapted for example, to bear the fuel element manipulating system, is mounted either directly in the reactor vessel or in a first plug secured to the vessel. The plug generally comprises an outer member 1 extending into the orifice 3 to be closed and is secured outside the vessel to a ring 2 resting on a track 4 borne by a stationary element 6 which is either the vessel wall or the stationary plug.

According to the invention, the periphery of ring 2 is cut away and comprises a shoulder forming a slightly convex friction track 8. A tubular base 12 coaxial with ring 2 is secured in sealing-tight manner around ring 2 on base 6, and a flat annular seal 10 rests on base 12 and on track 8; the outer portion of seal 10 is retained on the base by a ring 14 associated with screws 16 extending through seal 10 and screwed to base 12, whereas the inner portion of seal 10 rests on track 8.

Seal 10 preferably comprises a layer 18 of a substance having a high friction coefficient, e.g. "Teflon," in contact with the friction track 8, and a layer of resilient material 20 such as an elastomer or natural or synthetic rubber of the same size as and disposed above layer 18. Between the two layers, an annular spring disc 22 of stainless steel or austenitic steel coated for protection against corrosion tends to press friction layer 18 against tract 8, whereas a second annular spring disc 24 of the same material as strip 22 above layer 20 clamps the sealing assembly 10. Seal 10 is constructed so as to be in continuous contact with tract 8 held by the resilient action of discs 22 and 24.

The resulting force on track 8 is sufficient to provide adequate sealing-tightness when the reactor stops and plug 1 and ring 2 are rotated. Layer 18 serves mainly to withstand friction, whereas layer 20 and the springs provide elasticity.

When the reactor starts, the dynamic sealing-tightness is increased by an additional clamping of seal 10 to track 8. In the embodiment shown in FIG. 1, the clamping is provided by an inflatable seal 26 disposed in a groove 27 and held therein by its expansion or by an adhesive. Groove 27 is formed in a ring 28 secured, e.g., by screws 30, to ring 2 above the friction track 8. Seal 26 is connected to a pressure fluid source by conduit 26'. When the reactor is in operation, seal 26 inflates and exerts sufficient pressure on seal 10 to provide static sealing-tightness between the plug and the reactor vessel. When the reactor stops, on the other hand, seal 26 can readily be deflated, thus reducing the clamping force of seal 10 on track 8 during rotation of ring 2 and plug 1.

Sealing-tightness can be further improved in known manner by filling the space 42 between ring 2, seal 10, inflatable seal 26 and ring 30 with a fluid, e.g., a silicone, which lubricates the seal 10 and preserves its resilience. Any fluid leaking past seal 10 drains into a groove 44 formed for this purpose along the periphery of seal 10.

Figure 3:
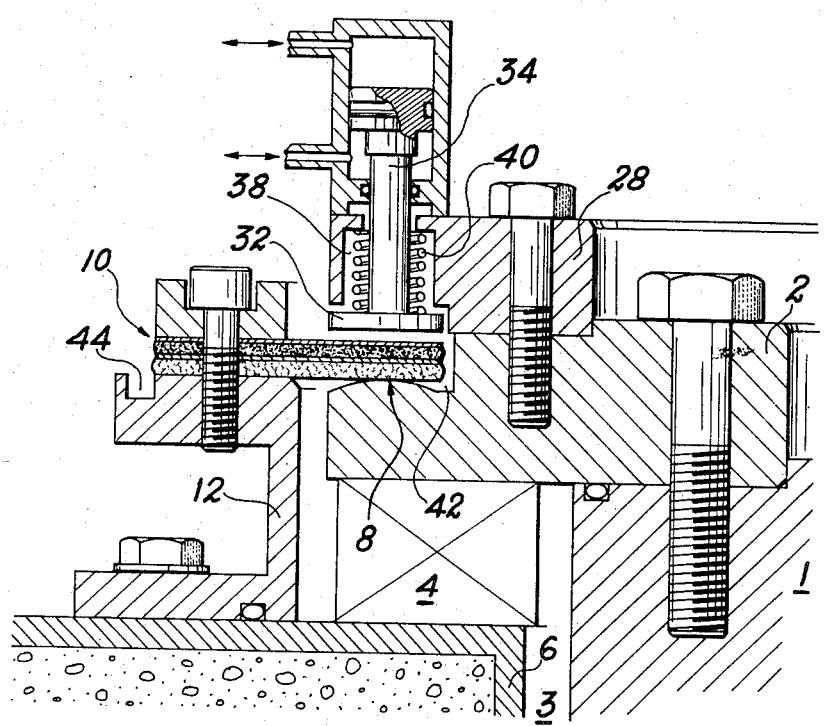
FIG. 3 is a view similar to that of FIG. 2 showing other means for releasing the seal when the plug is in the rotation position.

The retractable clamping system can be embodied by elements different from the inflatable seal 26, e.g., it can comprise hydraulic jacks shown in FIG. 3 which are mounted on bush 28 and includes springs 40 which exert force on ring 10 when the reactor is in operation.

Figure 2:
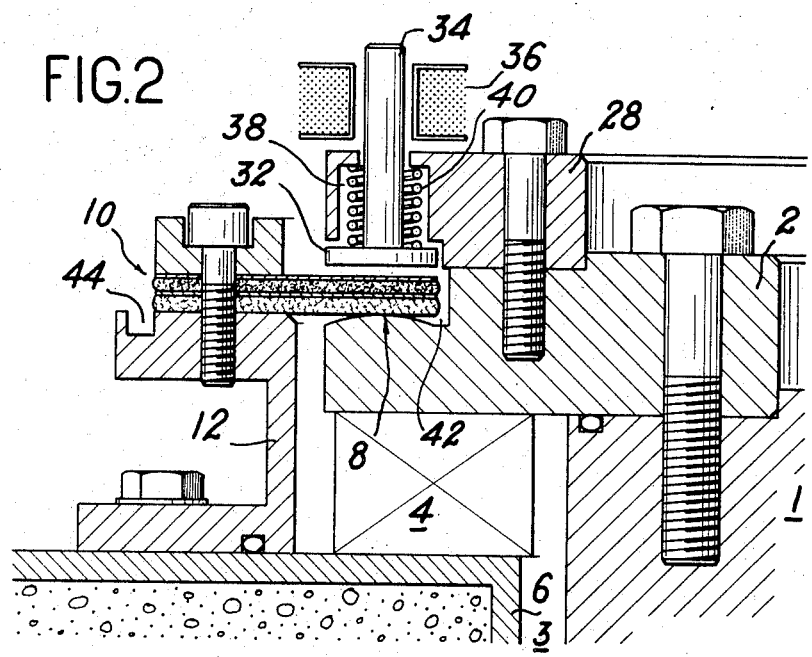
FIG. 2 is a view in partial longitudinal cross-section of an alternative embodiment, when the plug is in the rotation position.

According to another embodiment (FIG 2), the clamping system can comprise a flat ring 32 parallel with seal 10. Ring 32 is connected to rods 34 extending through ring 28 and beyond it as far as the center of electromagnets 36 for moving rods 34 and ring 32 upwardly, i.e., to a position disengaged from seal 10.

Each rod 34 is disposed on the axis of a recess 38 formed in ring 28 and is surrounded by a spring 40 bearing against the upper wall of recess 38 and against ring 32. Spring 40 tends to push ring 32 towards seal 10 as soon as the electromagnet 36 is de-energised. Ring 32 can therefore be clamped effectively against seal 10 and track 8 merely by switching off the electromagnet.

Whatever embodiment of the clamping device is used, it does not act on seal 10 except when necessary, i.e., when the reactor is in operation. It can provide a very large contact pressure between the seal and the friction track, thus ensuring adequate static sealing-tightness, yet enables the pressure to be reduced as soon as it ceases to be needed. When the plug rotates, therefore, the seal alone provides sealing-tigheness and the risk of damage by friction is very slight. The seal therefore retains all its efficiency and can be used for very long periods.

The clamping means can be inspected or replaced whenever necessary, by dismantling ring 28 or bush 14. Ring 28 can be taken out by loosening screws 30. Seal 10 provides adequate sealing-tightness during the instant when seal 26 or ring 32 is inoperative. Seal 10 can easily be reached when bush 14 is loose.

Of course, other modifications can be made to the embodiments which have been described, without departing from the invention. For example, ring 14, ring 28 and even the rubber lining or layer 20 can comprise a number of pieces.

I claim:

1. A device for sealing a nuclear reactor plug rotating in a stationary bearing and secured to a ring disposed above the stationary bearing and resting on an annular track positioned on the bearing comprising a second annular friction track on the entire periphery of the top part of the ring, an annular base coaxial with the plug and secured in sealing-tight manner to the stationary bearing around the ring and the track, an annular seal mounted on the annular base and bearing on the friction track of the ring, said seal comprising at least one friction ring, an annular spring ring above and engaging said friction ring, a resilient annular ring above and engaging said spring ring and an annular clamping spring ring above and engaging said resilient ring, and retractable means for clamping said seal against said friction track mounted above said seal and disposed in a second ring secured to said first ring.

2. A device according to claim 1, wherein said clamping means include an inflatable hollow seal disposed in a groove in said second ring in contact with the upper surface of said seal.

3. A device according to claim 1, wherein said clamping means include jacks mounted in recesses in said second ring and engaging the upper surface of said seal.

4. A device according to claim 1, wherein said clamping means include a flat ring parallel to said seal, rods connected to said flat ring extending through said second ring, electromagnets above said second ring acting on said rods moving said flat ring to a retracted position, and springs for clamping said flat ring on said seal.

* * * * *